May 16, 1939.　　　E. F. KOHL　　　2,158,823
ELECTRIC MOTOR
Original Filed April 2, 1936
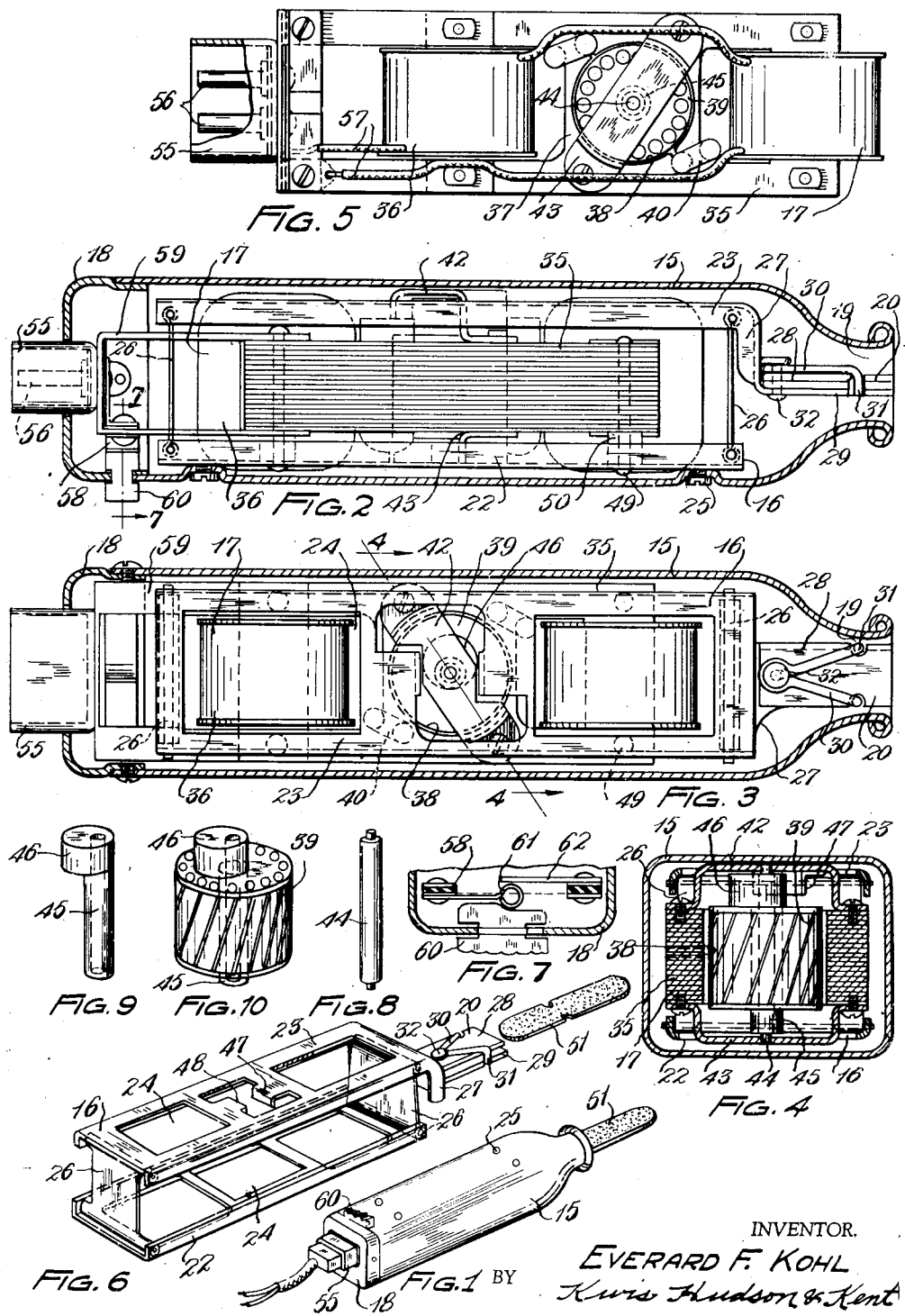
INVENTOR.
EVERARD F. KOHL
BY Kwis Hudson & Kent
ATTORNEYS Patented May 16, 1939

2,158,823

UNITED STATES PATENT OFFICE 2,158,823

ELECTRIC MOTOR

Everard F. Kohl, Cleveland, Ohio, assignor to Selco Products, Inc., Cleveland, Ohio, a corporation of Ohio Original application April 2, 1936, Serial No. 72,384. Divided and this application May 28, 1937, Serial No. 145,250

2 Claims. (Cl. 172—36)

This invention relates to electric motors and more particularly to an improved motor especially suitable for such service as operating manicuring implements, engraving or dental tools, or for driving a toy train.

This application is a division of my original application, Serial No. 72,384, filed April 2, 1936, now Patent No. 2,131,628, issued September 27, 1938.

An object of my invention is to provide a novel electric motor of reduced size and compact construction and which is capable of developing substantial power in proportion to its size and weight.

Another object of my invention is to provide an improved electric motor of reduced size comprising an elongated laminated frame having field coils adjacent the ends thereof and a transverse opening at an intermediate point in which a rotary armature is operable.

A further object of this invention is to provide an improved electric motor comprising a frame having magnet poles and a non-rotatable shaft disposed in an opening adjacent the poles and in which an armature operable in such opening is rotatably mounted on the shaft.

Other objects and advantages of the invention will be apparent from the following description when taken in conjunction with the accompanying sheet of drawings wherein Fig. 1 is a perspective view showing a device in which my improved electric motor is embodied for the operation of a reciprocating manicuring tool;

Fig. 2 is a side elevation of the device with the casing broken away to show the motor and the motor support therein;

Fig. 3 is a plan view of the device with the casing broken away to show the motor and motor support;

Fig. 4 is a transverse sectional view taken through the device as indicated by line 4—4 of Fig. 3;

Fig. 5 is a bottom plan view of the motor removed from the casing;

Fig. 6 is a perspective view showing the motor support detached from the casing and motor with a tool ready to be moved into engagement with the tool connecting means;

Fig. 7 is a partial sectional view taken on line 7—7 of Fig. 2 to illustrate the motor control switch;

Fig. 8 is a perspective view showing the armature shaft in detached relation;

Fig. 9 is a perspective view showing the armature bushing and eccentric; and

Fig. 10 is a perspective view showing the armature with the bushing and eccentric assembled thereon.

More detailed reference will now be made to the accompanying drawing wherein I have illustrated one embodiment of my improved electric motor and show the motor as being used to cause reciprocation of a manicuring implement. Before proceeding with the detailed description, however, it should be understood that my improved motor can be used for the operation of various other tools and devices and can be embodied in various different mechanisms.

My improved motor, as has already been indicated, may be used for operating small tools, such as manicuring implements and the like, and for the convenience of the operator and other reasons, I construct the motor of such size and shape that, when contained in a suitable housing, it can be readily held in the hand of the operator. As shown in the drawing the device may comprise an elongated casing 15 of rectangular or other desired cross-section in which the motor support 16 and motor 17 are contained. The casing may be of sheet metal or other suitable construction and may be provided at one end with a cover 18, the removal of which permits the insertion or removal of the motor and motor support. At its opposite end the casing has an opening 19 through which the tool to be operated may be inserted for engagement with a tool holding chuck or connecting means 20.

The support 16 may be a frame-like structure comprising a pair of elongated members 22 and 23 in spaced substantially parallel relation and between which the motor 17 is received. As best shown in Fig. 6 of the drawing, the members 22 and 23 may be of stamped sheet metal construction, each member being of generally flat shape but having the side edges thereof deflected to form longitudinally extending reenforced angular corners. Both of these members may have openings 24 therein which accommodate projecting structural portions of the motor. The member 22 may be connected wtih one wall of the casing 15 as by suitably located screws 25, and the member 23 may be connected with the member 22 so as to be movable relative thereto, preferably having a translatory movement which in this instance is a movement substantially in the direction of the axis of the casing. Connecting means suitable for this purpose may be in the form of links 26 having pivotal connection with the members 22 and 23 adjacent their ends.

To provide for connection of the tool to be operated with the longitudinally movable member 23 I provide the latter with an angular portion 27 at one end thereof. This angular portion 27 with which the tool connecting chuck or means 20 is connected, extends toward the member 22 a distance sufficient to permit the chuck to be located adjacent the opening 19 and substantially on the longitudinal axis of the casing. The tool holding chuck 20 may be of any suitable construction or form and, as shown in this instance, may comprise spaced plate members 28 and 29 and a retaining spring 30 having fingers 31 engaging in openings provided in opposite edges of the plate members. The plate member 29 may, if desired, be an integral part of the angular extension of the member 23, and the spring 30 and the plate member 28 may be connected therewith by a rivet 32 or the equivalent.

The electric motor 17, which supplies the power for the operation of the tool, is elongated in corresponding relation to the elongated casing 15 and motor support 16. This motor may have an elongated frame 35, of laminated construction, adjacent the ends of which are mounted suitable field coils or windings 36 in surrounding relation to portions of the frame. At a point intermediate the field coils 36 the frame is provided with transverse portions forming opposed poles 37 and an opening 38 between the poles and in which a suitable rotary armature 39 is operable. This motor may be of the type known as a "shaded pole" motor so that it will have self-starting characteristics when operated on alternating current from the ordinary domestic lighting circuit. To this end the motor may include suitably constructed and located "shading" coils 40 which produce the desired pole-shading effect.

As a feature of construction of this motor I provide novel means for mounting the armature 39. This mounting means may include a pair of brackets 42 and 43 on the frame at opposite ends of the armature opening 38, and a shaft 44 which extends through the armature opening and has its ends non-rotatably mounted in the brackets. The armature 39, which may be of any suitable construction, is provided with a central opening in which a bushing or sleeve 45 is pressed or otherwise fitted. The armature is rotatably mounted on the shaft 44 with the bushing 45 thereof having bearing surface of substantial area in engagement with the shaft.

A drive connection between the armature 39 and the tool operating member 23 may be established in various ways but I find that a very satisfactory drive connection may be obtained by providing the armature with a cam, preferably in the form of an eccentric 46, which serves as a power take-off means and cooperates with spaced bearing elements on the tool operating member. The eccentric 46 may, if desired, be formed integral or connected with the bushing 45 so that, when the latter is connected with the armature, the bushing will be connected therewith also. The bearing elements of the tool operating member 23 may be in the form of a pair of longitudinally spaced, inwardly deflected integral lugs 47 and 48 which are engaged by substantially diametrically opposed portions of the eccentric. I prefer to construct the bushing 45 and the eccentric 46 of lubricating metal, that is, of metal having self-lubricating or lubricant-bearing characteristics.

As mentioned above, the motor 17 is received between the spaced members 22 and 23 of the motor support 16 and, if desired, it may be connected with the member 22 by suitable rivets 49 or the like which extend through this member and through the laminated frame 35. Suitable spacing bushings 50 may be provided on the rivets between the motor frame and the member 16. When the motor is thus supported between the members 22 and 23 the eccentric 46 extends into the space between the lugs 47 and 48 so that, upon rotation of the armature and eccentric, the member 23 will be reciprocated longitudinally within the casing. Such reciprocation of the tool operating member 23 imparts movement to the tool or implement held by the chuck 20 which, as illustrated in Figs. 1 and 6, may be a manicurist's emery board 51 or other implement. To permit the eccentric 46 to cooperate in the desired manner with the bearing elements 47 and 48, the bracket 42 may have opposed clearence recesses or notches 52 formed in the edges thereof. It will be understood, of course, that the extent of movement or stroke of the tool will ordinarily be determined by the eccentricity of the member 46 and that the stroke may be varied as desired by correspondingly varying the characteristics of this member.

For supplying energizing current to the electric motor 17, I may provide the device with a suitable plug receptacle 55 having a pair of contacts 56 which are connected with terminal wires 57 of the motor through a control switch 58. The plug receptacle 55 and the switch 58 may, if desired, be mounted upon a suitable bracket 59 which is connected with the motor frame and extends toward the open end of the casing 15. The control switch 58 may comprise an actuating member 60 slidable in a slot of the cover 18 and adapted to deflect a resilient contact 61 into engagement with a second resilient contact 62. As shown in Fig. 2, the plug receptacle 55 may extend into or through an opening of the cover 18 so that the contacts 56 thereof, as well as the switch actuating member 60, will be accessible from the exterior of the casing.

Although in the embodiment of my invention herein disclosed I show my motor applied to the operation of a reciprocating tool, it will be readily understood by those skilled in the art that by the use of suitable gearing in place of the eccentric 46 and the reciprocable member 23, the rotational movement of the armature can be made to operate various rotary tools and other devices. Likewise, it will be readily understood by those skilled in the art that my electric motor can be mounted in various housings or casings differing in shape from the casing which forms a part of the embodiment illustrated in this instance.

From the foregoing description and the accompanying drawing, it will now be readily understood that I have provided an improved electric motor for operating various tools and mechanisms and that a device embodying my novel motor can be of relatively small and compact form and, where the tool to be operated is a manicuring implement or the like, the device may be of a size and shape to be conveniently held in the hand of the operator. It will be understood further that my electric motor, being relatively elongated, of reduced size, and capable of large power output in proportion to its size, is especially suitable for applications of this character.

While I have illustrated and described the device of my invention in a somewhat detailed manner, it will be understood, of course, that I do not wish to be limited to the precise details of construction and arrangements of parts herein disclosed, but regard my invention as including such changes and modifications as do not involve a departure from the spirit of the invention and the scope of the appended claims.

Having thus described my invention, I claim:

1. In an electric motor, a frame having spaced field poles and a fixed shaft extending between the poles, an armature having an axial sleeve connected therewith and journaled on said shaft for mounting the armature for rotation between said poles, and an eccentric integral with said sleeve and providing the armature with a power take-off means, said sleeve and eccentric being formed of a lubricating metal.

2. In an electric motor, a frame having magnet poles spaced to provide an opening therebetween, a shaft extending into said opening and normally held against rotation, an armature disposed in said opening, a sleeve connected with said armature and rotatably mounting the same on said shaft, and an eccentric power take-off means connected with the armature by said sleeve.

EVERARD F. KOHL.